United States Patent
Hashimoto et al.

(10) Patent No.: US 12,510,434 B2
(45) Date of Patent: Dec. 30, 2025

(54) GAS PRESSURE MONITORING DEVICE OF GAS INSULATED SWITCHGEAR, GAS PRESSURE MONITORING METHOD THEREOF, AND GAS LEAK POSITION IDENTIFICATION METHOD

(71) Applicant: Hitachi Energy Ltd, Zürich (CH)

(72) Inventors: Hiroaki Hashimoto, Tokyo (JP); Takashi Iida, Tokyo (JP); Yuki Koyama, Tokyo (JP)

(73) Assignee: HITACHI ENERGY LTD, Zürich (CH)

( * ) Notice: Subject to any disclaimer, the term of this patent is extended or adjusted under 35 U.S.C. 154(b) by 263 days.

(21) Appl. No.: 18/219,874

(22) Filed: Jul. 10, 2023

(65) Prior Publication Data

US 2024/0027298 A1 Jan. 25, 2024

(30) Foreign Application Priority Data

Jul. 19, 2022 (JP) ................................. 2022-114867

(51) Int. Cl.
*G01M 3/26* (2006.01)
*G01L 9/04* (2006.01)
(Continued)

(52) U.S. Cl.
CPC ..................... *G01M 3/26* (2013.01)

(58) Field of Classification Search
CPC .. G01L 9/00; G01L 9/04; G01L 19/04; G01M 3/00; G01M 3/26–32; G01M 3/36; H02B 13/035; H02B 13/065
See application file for complete search history.

(56) References Cited

U.S. PATENT DOCUMENTS 3,400,572 A * 9/1968 Mizenko ............. G01M 3/2869
73/37

FOREIGN PATENT DOCUMENTS

CN 109682556 A 4/2019
CN 115493776 A * 12/2022 .......... G01M 3/2807
(Continued)

OTHER PUBLICATIONS

JP H06117953 A Machine Translation (Year: 1994).*
(Continued)

*Primary Examiner* — Nguyen Q. Ha
(74) *Attorney, Agent, or Firm* — Sage Patent Group

(57) ABSTRACT

A gas pressure monitoring device of a gas insulated switchgear (100) of the present invention includes at least two cylindrical vessels (21, 23) that configure the gas insulated switchgear (100) to receive an insulating gas to be at an internal pressure. The at least two cylindrical vessels (21, 23) have flanges (21a, 23a), and a plurality of bolts (11) that fasten the flanges of the at least two cylindrical vessels (21, 23). At least one bolt (11b) of the plurality of bolts (11) includes at least one sensor (1, 2) provided on the inner peripheral face thereof toward each of an inner diameter side and an outer diameter side of a cylindrical vessel (23) to measure strain acting in the axial direction of the at least one bolt (11b) with the sensor (1, 2). A pressure gauge (104) is installed on the cylindrical vessel (23) and reads pressure of the insulating gas when the insulating gas is sealed into the cylindrical vessel (23). A measurement recording unit (103) records pressure values output from the pressure gauge (104) and values output from the sensor (1, 2). An evaluation unit (106) calculates relationship between the pressure of the insulating gas and the stress acting on the at least one bolt (11b) with the sensor (1, 2) when the insulating gas is sealed into the cylindrical vessel (23), wherein, after an operation (Continued)

of the switchgear (100) is started, change in the pressure ($\Delta P$) of the insulating gas in the cylindrical vessel (23) is estimated from change in the stress acting on the at least one bolt (11b) with the sensor (1, 2), so as to enhance monitoring the pressure of the insulating gas.

8 Claims, 7 Drawing Sheets

(51) Int. Cl.
      *G01L 19/04*      (2006.01)
      *H02B 13/035*      (2006.01)
      *H02B 13/065*      (2006.01)

(56) References Cited

FOREIGN PATENT DOCUMENTS

| | | | | |
|---|---|---|---|---|
| JP | H02266808 A | | 10/1990 | |
| JP | H06117953 A | * | 4/1994 | ............. G01L 19/04 |
| JP | 2016-57135 A | | 4/2016 | |
| JP | 2019-9948 A | | 1/2019 | |
| JP | 2020-72614 A | | 5/2020 | |
| WO | 2021010263 A1 | | 1/2021 | |

OTHER PUBLICATIONS

CN-115493776-A Machine Translation (Year: 2022).*
Japanese Office Action and English Translation, Japanese Patent Application 2022-114867, mailed Oct. 28, 2025, 6 pages.

\* cited by examiner

GAS PRESSURE MONITORING DEVICE OF GAS INSULATED SWITCHGEAR, GAS PRESSURE MONITORING METHOD THEREOF, AND GAS LEAK POSITION IDENTIFICATION METHOD

CLAIM OF PRIORITY

The present application claims priority from Japanese Patent Application JP 2022-114867 filed on Jul. 19, 2022, the content of which is hereby incorporated by reference into this application.

BACKGROUND OF THE INVENTION

The present invention relates to a gas pressure monitoring device of a gas insulated switchgear, a gas pressure monitoring method thereof, and a gas leak position identification method. More specifically, the present invention relates to a gas pressure monitoring device of a gas insulated switchgear suitable for observing the change in the pressure of an insulating gas sealed in a cylindrical vessel of the gas insulated switchgear or the like to detect the pressure of the gas, a gas pressure monitoring method thereof, and a gas leak position identification method of a gas insulated switchgear suitable for identifying the position of a gas leak from a flange of the cylindrical vessel.

A gas insulated switchgear protects equipment, such as a transformer, of an electric power substation when an abnormal electric current flows into a power system due to a lightning strike or the like, the electric current is instantly shut off, and then is immediately inputted/restored to perform power supply.

The gas insulated switchgear has a configuration in which a plurality of gas pressure vessels configuring a gas circuit breaker, a disconnector, a grounding switch, and the like are coupled, and as an insulating gas sealed in the gas pressure vessels, for example, sulfur hexafluoride (hereinafter, referred to as an $SF_6$) is typically used.

The $SF_6$ is an inert gas, and is excellent in current arc extinguishing performance as compared with other gases, but since it has a high global warming potential that is 24,000 times that of $CO_2$, it is to be gas leak managed.

As a conventional art for detecting the leak of the $SF_6$ gas in the gas insulated switchgear, for example, there is a gas leak inspection method described in a document JP 2016-57135.

In the gas leak inspection method described in JP 2016-57135, a gas leak detection device includes a pressure sensor measuring a gas pressure in a gas pressure vessel, a temperature sensor measuring the surface temperature of the gas pressure vessel, a recording unit, and the like, the gas pressure measured by the pressure sensor is converted to a value at a reference temperature of 20° C. to linearly regress the pressure measurement result, and a gas leak is detected according to whether the slope of the regression line exceeds the slope of the gas leak at a defined concentration.

In addition, in an accident point evaluation device in a document JP 2019-9948, described is a conventional art in which in the gas insulated switchgear, a gas section in which an accident has occurred is evaluated by using a strain sensor.

The accident point evaluation device described in JP 2019-9948 includes a strain detection means on a metal pipe configuring the gas section, an electric current measurement means, and a recording unit, and the like, and evaluates the gas section that is an accident point on the basis of a recorded signal from the strain detection means when an electric current detected by the gas insulated switchgear exceeds a predetermined value.

Further, a document JP 2020-72614 discloses a conventional art of a gas pressure monitoring device of a gas insulated switchgear, in which, in a gas circuit breaker configuring the gas insulated switchgear, a pressure gauge for observing the pressure of the sealed $SF_6$ is installed, and an inspection staff regularly inspects the indication value of the pressure gauge to determine the presence or absence of the leak of the $SF_6$ gas.

However, in the gas leak inspection method described in JP 2016-57135, the gas pressure sensor is required to be provided in each gas section, and the gas is led from within the sealed vessel through the piping to the external pressure sensor, so that a plurality of seal portions for the gas are required with respect to the monitoring of one sealed vessel, and consequently, the gas can be leaked from those seal portions.

In addition, in the accident point evaluation device described in JP 2019-9948, the strain sensor is attached to the outer face of the metal cylindrical vessel configuring the gas insulated switchgear, and the strain value is monitored by the strain sensor, so that the accident point evaluation device having less gas leak risk is obtained, but since the metal cylindrical vessel has the predetermined rigidity, the change in the output of the strain sensor with respect to the change in the gas pressure during the operation of the gas insulated switchgear is assumed to be small.

Therefore, in the accident point evaluation device described in JP 2019-9948, it is considered that it is difficult to detect the gas leak in the cylindrical vessel at high accuracy.

Further, in the gas pressure monitoring device of the gas insulated switchgear described in JP 2020-72614, even when the abrupt increase in the leak amount of the gas occurs in the gas circuit breaker in which aging deterioration has progressed, there is a possibility that it cannot be detected when the inspection staff performs patrol and inspection about once a week, and in addition, since the leak of the insulating gas of the gas circuit breaker is a phenomenon seen from the progress of deterioration through a considerable number of years after installation, it is wasteful to mount and operate the device that automatically monitors the gas pressure from the beginning of the installation of the gas circuit breaker and in addition, the maintenance of the monitoring device can be costly.

SUMMARY OF THE INVENTION

The present invention has been made in view of the above points. A first object of the present invention is to provide a low-cost gas pressure monitoring device and a low-cost gas pressure monitoring method of a gas insulated switchgear.

In addition, a second object of the present invention is to provide a gas leak position identification method of the gas insulated switchgear that can identify the position of a gas leak from a flange of a cylindrical vessel.

To achieve the first object, a gas pressure monitoring device of a gas insulated switchgear of the present invention comprises: at least two cylindrical vessels (21, 23) that configure the gas insulated switchgear (100) to receive an insulating gas to be at an internal pressure. The at least two cylindrical vessels (21, 23) have flanges (21a, 23a), and a plurality of bolts (11) that fasten the flanges of the at least two cylindrical vessels (21, 23). At least one bolt (11b) of the plurality of bolts (11) includes at least one sensor (1, 2)

provided on the inner peripheral face thereof toward each of an inner diameter side and an outer diameter side of a cylindrical vessel (23) to measure strain acting in the axial direction of the at least one bolt (11b) with the sensor (1, 2). A pressure gauge (104) is installed on the cylindrical vessel (23) and reads pressure of the insulating gas when the insulating gas is sealed into the cylindrical vessel (23). A measurement recording unit (103) records pressure values output from the pressure gauge (104) and values output from the sensor (1, 2). An evaluation unit (106) calculates relationship between the pressure of the insulating gas and the stress acting on the at least one bolt (11b) with the sensor (1, 2) when the insulating gas is sealed into the cylindrical vessel (23), wherein, after an operation of the switchgear (100) is started, change in the pressure ($\Delta P$) of the insulating gas in the cylindrical vessel (23) is estimated from change in the stress acting on caused in the at least one bolt (11b) with the sensor (1, 2), so as to enhance monitoring the pressure of the insulating gas.

In addition, to achieve the first object, a gas pressure monitoring method of a gas insulated switchgear of the present invention includes: a step that at least one bolt of a plurality of bolts fastening flanges of at least two cylindrical vessels is targeted, the vessels configuring the gas insulated switchgear and receiving an internal pressure; a step that pressure of an insulating gas in a cylindrical vessel is detected by a sensor mounted on the one bolt, the cylindrical vessel being in a state where the gas insulated switchgear is operated; and a step that change in a stress acting on the one bolt is estimated based on detection values of the sensor to monitor the pressure of the insulating gas.

To achieve the second object, a gas leak position identification method of a gas insulated switchgear of the present invention includes: a step that a sensor is installed on at least one bolt (11b) of a plurality of bolts (11), the bolts (11) fastening flanges (21a, 23a) of at least two cylindrical vessels (21, 23) that configure the gas insulated switchgear (100) and receive an internal pressure, and the sensor (1, 2) detecting stresses acting on the at least one bolt (11b) of the respective two cylindrical vessels (21, 23); and a step that values of the stresses acting on the at least one bolt (11b) of the respective two cylindrical vessels (21, 23) detected by the sensor (1, 2) are compared with one another to identify a position of a gas leak from the flanges.

Advantageous Effects of Invention

According to the present invention, it is possible to monitor the gas pressure with less gas leak risk and without changing the existing device configuration and to obtain the gas pressure monitoring device of the gas insulated switchgear that has simple and low-cost structure. It is also possible to identify the position of the gas leak from the flange of the cylindrical vessel.

DETAILED DESCRIPTION OF THE PREFERRED EMBODIMENTS

Figure 1:
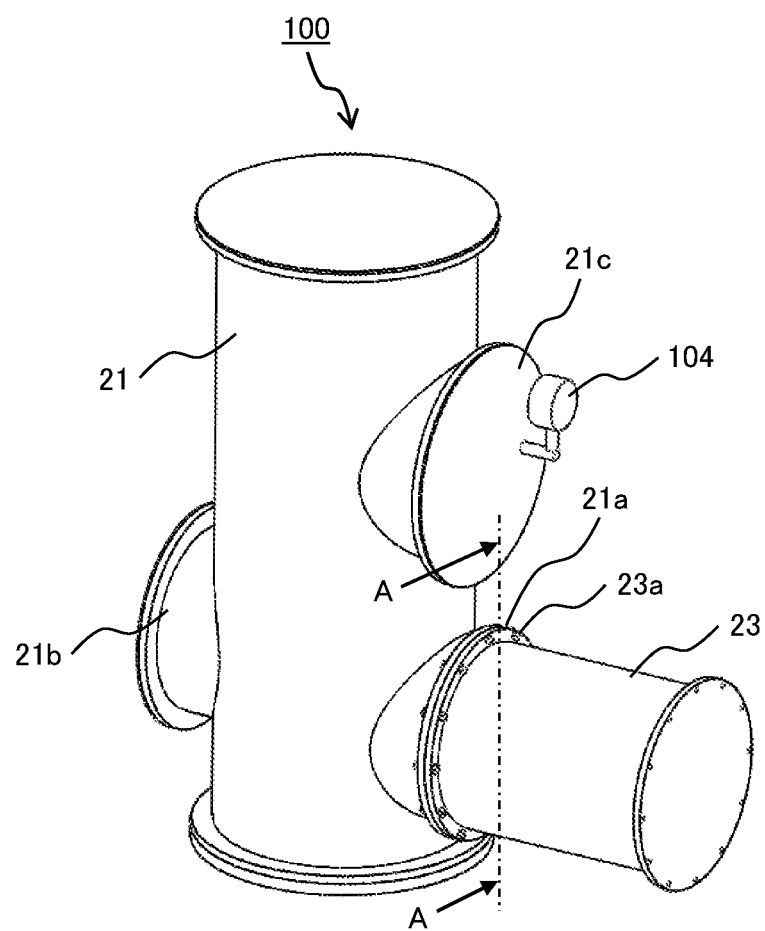
FIG. 1 is a perspective view illustrating an example configuration of a gas insulated switchgear (100) targeted by the present invention, two cylindrical vessels (21, 23) are coupled through flanges (21a, 23a)

Hereinafter, a gas pressure monitoring device of a gas insulated switchgear, a gas pressure monitoring method thereof, and a gas leak position identification method of the present invention will be described with reference to the illustrated embodiments. It should be noted that in the respective drawings, the same reference numerals are used for the same components.

First Embodiment

FIG. 1 is a perspective view illustrating an example configuration of a gas insulated switchgear (100) targeted by the present invention, two cylindrical vessels (21, 23) are coupled through flanges (21a, 23a).

As illustrated in FIG. 1, a gas insulated switchgear 100 that is typical has a configuration in which a plurality of cylindrical vessels (in FIG. 1, illustrated are only a first cylindrical vessel 21 installed in the vertical direction and a second cylindrical vessel 23 extending in the horizontal direction from the first cylindrical vessel 21) are coupled. A conductor, not illustrated, is disposed in the first and the second cylindrical vessels 21 and 23, and an electric current is passed to the conductor from the busbar in an electric power substation.

In FIG. 1, an insulating gas, for example, an $SF_6$ gas, is sealed at a predetermined pressure in the first and the second cylindrical vessels 21 and 23 that are made of metal. A flange 21a to be joined with the second cylindrical vessel 23 and flanges 21b and 21c to be joined with other cylindrical vessels, not illustrated, are mounted on the first cylindrical vessel 21. In addition, a pressure gauge 104 indicating the gas pressure in the first cylindrical vessel 21 is installed on the flange 21c of the first cylindrical vessel 21.

It should be noted that the installation position of the pressure gauge 104 is not limited to the flange 21c of the first cylindrical vessel 21, and the pressure gauge 104 may be installed on the different flange 21b of the first cylindrical vessel 21, or a port that can measure the pressure in the first and the second cylindrical vessels 21 and 23 may be provided in the outer peripheral face of the first cylindrical vessel 21 other than the flanges to mount the pressure gauge 104 to the port. That is, in the gas pressure monitoring device of the gas insulated switchgear 100 of the present embodiment, an existing pressure gauge is used.

In addition, the first and the second cylindrical vessels 21 and 23 are coupled by a plurality of bolts through the flange 21a of the first cylindrical vessel 21 and a flange 23a of the second cylindrical vessel 23. The flange 21a of the first cylindrical vessel 21 and the flange 23a of the second cylindrical vessel 23 are typically designed at a predetermined rigidity so as to conform to the standards of the first and the second cylindrical vessels 21 and 23. Therefore, the case where the flanges are rigid-body-like so as not to be deformed at all even at the maximum usage pressure of the gas insulated switchgear 100 is different from the present invention.

Figure 2:
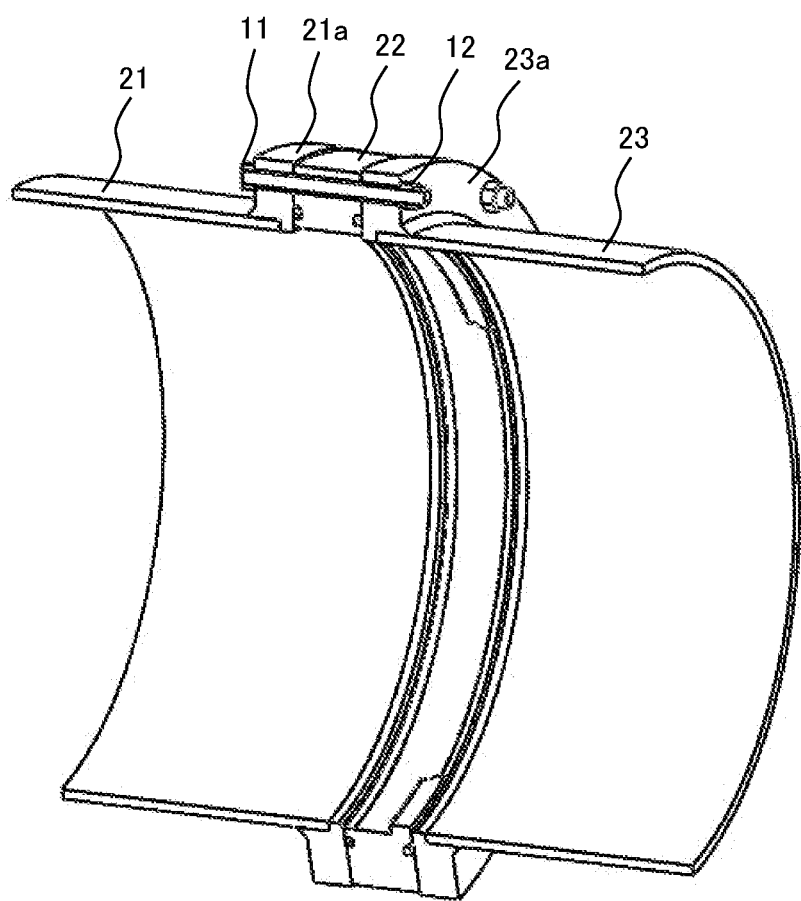
FIG. 2 is a cross-sectional perspective view taken along line A-A of FIG. 1.

FIG. 2 illustrates a cross-sectional view taken along line A-A of the coupling portion in which the first cylindrical vessel 21 and the second cylindrical vessel 23 are coupled by the plurality of bolts through the flange 21a of the first cylindrical vessel 21 and the flange 23a of the second cylindrical vessel 23.

The first and the second cylindrical vessels 21 and 23 illustrated in FIG. 2 are each configured of a hollow vessel having a predetermined wall thickness, and the conductor, not illustrated, is disposed in the interior of the first and the second cylindrical vessels 21 and 23. In addition, a spacer 22 is disposed midway between the flange 21a of the first cylindrical vessel 21 and the flange 23a of the second cylindrical vessel 23. It should be noted that examples of the material of the spacer 22 include both of a metal, such as an aluminum alloy, and a non-metal, such as an epoxy resin, but in the present invention, the material of the spacer 22 is not limited.

In FIG. 2, the flange 21a of the first cylindrical vessel 21, the flange 23a of the second cylindrical vessel 23, and the spacer 22 are coupled by a bolt fastening body including a bolt with head 11 and a nut 12.

For the bolt fastening body according to the present embodiment, the combination of the bolt with head 11 and the nut 12 is illustrated, but the bolt fastening body according to the present embodiment may have a configuration in which a so-called stud bolt in which a head is omitted is used to fasten both ends thereof by the nuts 12.

In addition, in FIG. 2, the diameter of the bolt with head 11 is typically configured to be smaller as compared with the thickness of the flange 21a of the first cylindrical vessel 21 and the flange 23a of the second cylindrical vessel 23 and to have a dimension having a predetermined bending rigidity. Therefore, the case where the rigid-body-like bolt such that the bolt is not deformed at all even at the maximum usage pressure is applied should be different from the present invention.

Next, the configuration of the gas pressure monitoring device of the gas insulated switchgear 100 according to the present embodiment will be described with reference to FIG. 3. It should be noted that FIG. 3 illustrates a state where strain sensors 1 and 2 are attached to the bolt with head 11 on the basis of the cross-sectional view taken along line A-A of the coupling portion of the flange 21a of the first cylindrical vessel 21 and the flange 23a of the second cylindrical vessel 23 illustrated in FIG. 2, and the connection state of a signal line 101 of the strain sensors 1 and 2, a strain amplifier 102, a measurement recording unit 103, an evaluation unit 106, and a monitoring monitor 107.

Figure 3:
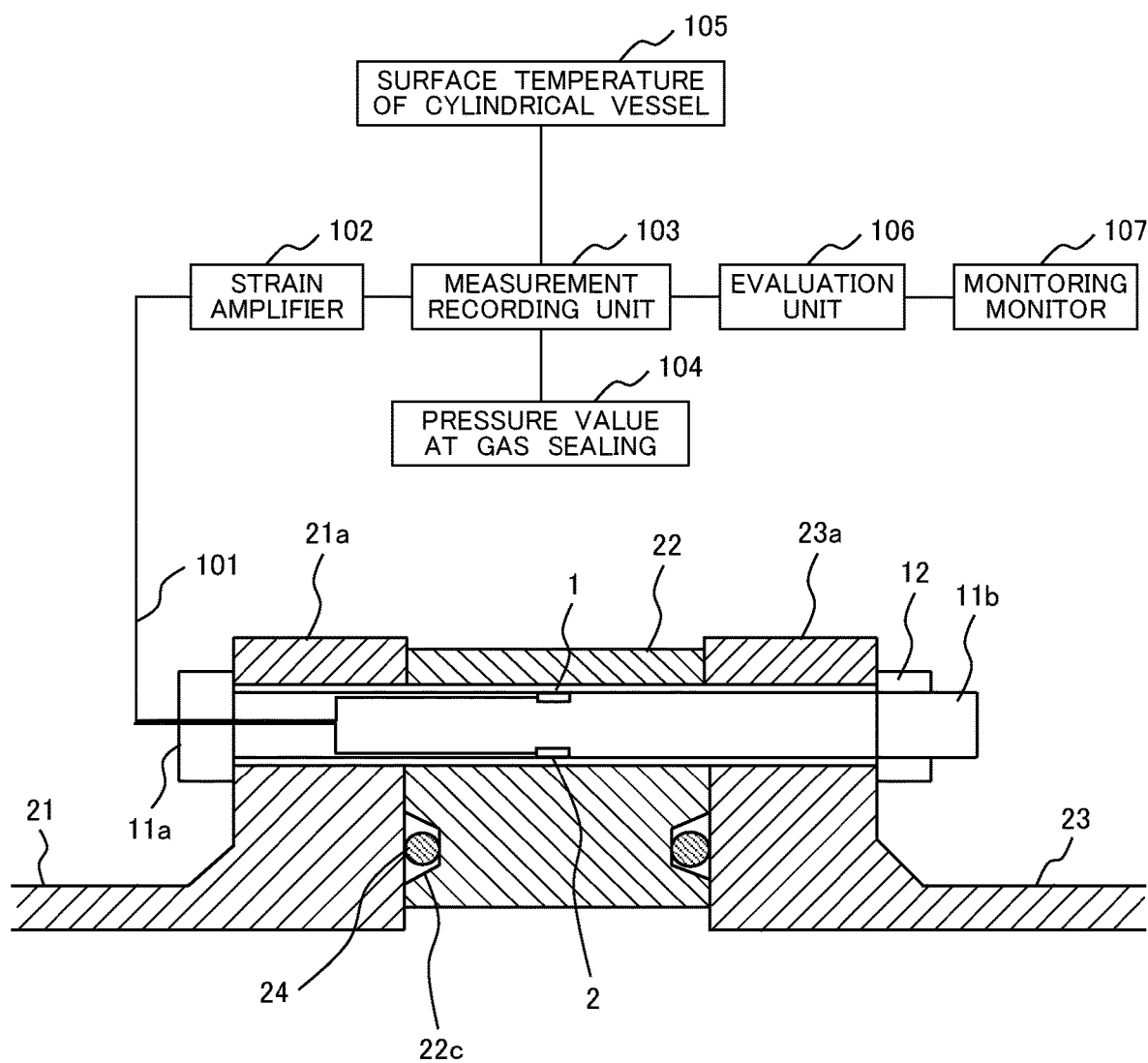
FIG. 3 is a cross-sectional view illustrating the coupling portion of the two cylindrical vessels according to a first embodiment of gas pressure monitoring device of the gas insulated switchgear of the present invention.

In FIG. 3, an O ring groove 22c for sealing the insulating gas, such as the $SF_6$ gas, is provided in the coupling portion of the spacer 22, the flange 21a of the first cylindrical vessel 21, and the flange 23a of the second cylindrical vessel 23, and an O ring 24 configured of a predetermined material is fitted in the interior of the O ring groove 22c.

In addition, the strain sensors 1 and 2 are provided on the inner peripheral face of a bolt with head 11b at a position substantially midway between the end faces of the flange 21a of the first cylindrical vessel 21 and the flange 23a of the second cylindrical vessel 23 in the axial direction of the bolt with head 11b.

The strain sensor 2 is provided on toward the inner diameter side of the first and the second cylindrical vessels 21 and 23, and the strain sensor 1 is provided toward the outer diameter side of the first and the second cylindrical vessels 21 and 23. The signal line 101 from the strain sensors 1 and 2 is penetrated through the interior of the bolt with head 11b, is drawn out to the outside from a bolt head 11a of the bolt with head 11b, and is connected to the strain amplifier 102. Then, the strain signal amplified by the strain amplifier 102 is inputted to the measurement recording unit 103.

It should be noted that the signals of the strain sensors 1 and 2 and the reading value of the pressure gauge 104 when the $SF_6$ gas is sealed into the first and the second cylindrical vessels 21 and 23 are inputted to the measurement recording unit 103. In addition, a surface temperature 105 of the first cylindrical vessel 21 and/or the second cylindrical vessel 23 is also inputted. (The surface temperature 105 of the first cylindrical vessel 21 and/or the second cylindrical vessel 23 is detected by a temperature sensor that is not illustrated in the drawings.)

On the basis of the results recorded by the measurement recording unit 103, the gas pressure in the first and the second cylindrical vessels 21 and 23 is estimated and monitored by the gas pressure monitoring method in steps 1 to 6 described later.

According to such embodiment, one of the plurality of flange fastening bolts coupling the first and the second cylindrical vessels 21 and 23 configuring the gas insulated switchgear 100 is replaced with the bolt with strain sensor (the bolt with head 11b), so that the pressure in the first and the second cylindrical vessels 21 and 23 can be estimated as in steps 2, 4 described later, and since no additional work for leading the pressure from the first and the second cylindrical vessels 21 and 23 to the strain sensors 1 and 2 is required, the gas pressure monitoring device can be provided without being modified in the existing gas insulated switchgear 100.

Next, the detail of the gas pressure monitoring method according to the present embodiment will be described with reference to FIGS. 4, 5, 6, 7, and 8 by using the flowchart in the gas pressure monitoring device of the gas insulated switchgear 100 of the present embodiment illustrated in FIG. 9.

[Step 1 (S1)]

The $SF_6$ gas in the first and the second cylindrical vessels 21 and 23 is brought into a state where it is discharged in the regular inspection or the like of the gas insulated switchgear 100 in which several years have elapsed after installation, at least one of the plurality of bolts coupling the flange 21a of the first cylindrical vessel 21 and the flange 23a of the second cylindrical vessel 23 is replaced with the bolt with head 11b on which the strain sensors 1 and 2 are installed, and bolt fastening is performed by using the bolt fastening body including the bolt with head 11b and the nut 12 at a defined torque.

Figure 4:
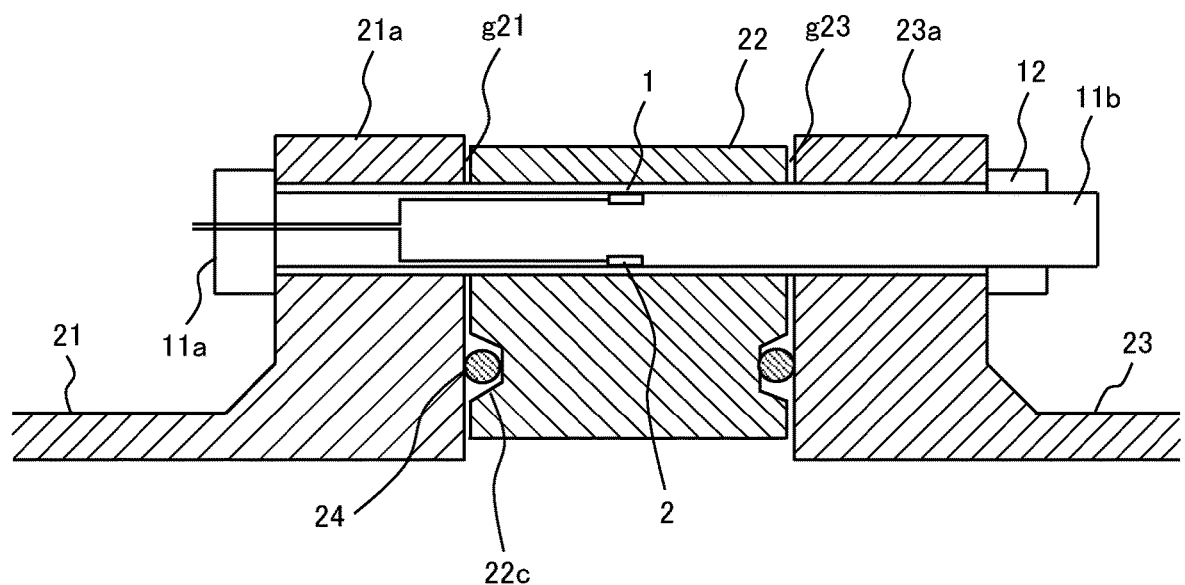
FIG. 4 is a cross-sectional view illustrating the coupling portion of the two cylindrical vessels according to the first embodiment of the gas pressure monitoring device of the gas insulated switchgear of the present invention and a state before an insulating gas is sealed into the two cylindrical vessels.

As illustrated in FIG. 4 illustrating the coupling portion of the flange 21a of the first cylindrical vessel 21 and the flange 23a of the second cylindrical vessel 23 when the bolt fastening by the bolt fastening body is completed, a gap g21 is present between the flange 21a of the first cylindrical vessel 21 and the spacer 22, and a gap g23 is present between the flange 23a of the second cylindrical vessel 23 and the spacer 22, but typically, the gaps g21 and g23 are in a state of being buried by caulking, grease, or the like.

The strain sensors 1 and 2 are attached substantially midway in the axial direction of the bolt with head 11b, and are arranged at positions apart from the gaps g21 and g23. Therefore, even when the caulking is deteriorated, it can be considered that the strain sensors 1 and 2 are not directly exposed to the outside air and the direct sunlight from the gaps g21 and g23, so that the deterioration of the strain sensors 1 and 2 can be prevented as compared with the conventional art in which the strain sensors are attached to the outer faces of the first and the second cylindrical vessels 21 and 23.

[Step 2 (S2)]

Figure 5:
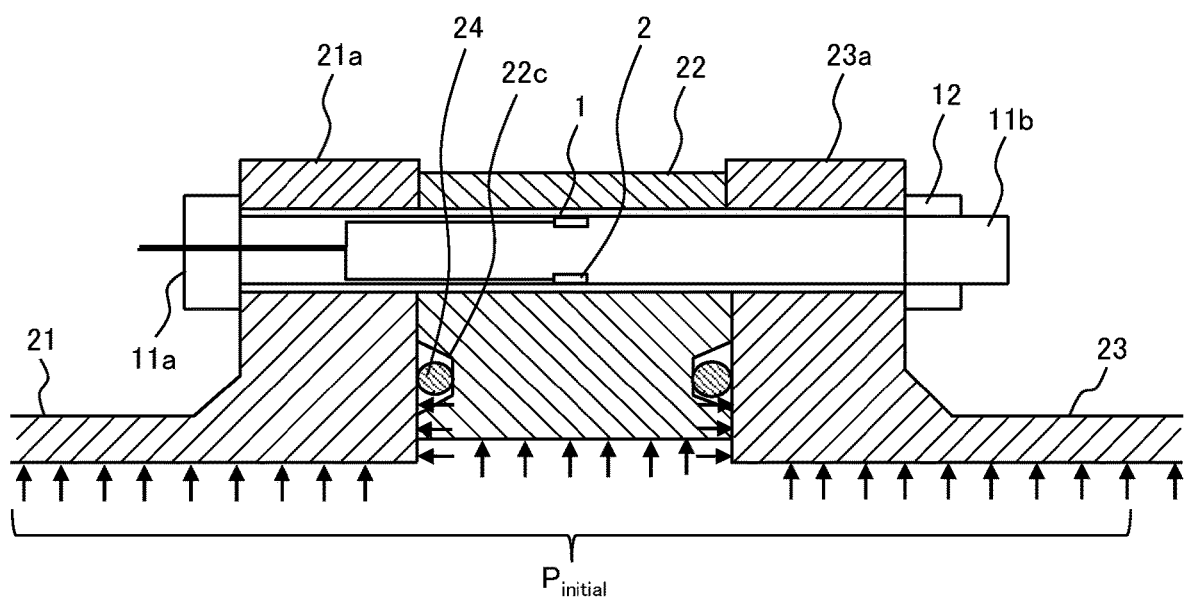
FIG. 5 is a cross-sectional view illustrating the coupling portion of the two cylindrical vessels according to the first embodiment of the gas pressure monitoring device of the gas insulated switchgear of the present invention and a state where the sealing of the insulating gas into the two cylindrical vessels is started.

As illustrated in FIG. 5 illustrating the coupling portion of the flange 21a of the first cylindrical vessel 21 and the flange 23a of the second cylindrical vessel 23 at the time of starting the sealing of the $SF_6$ gas or the like into the first and the second cylindrical vessels 21 and 23, the pressure $P_{initial}$ acts on the inside of the flange 21a of the first cylindrical vessel 21, the spacer 22, and the flange 23a of the second cylindrical vessel 23.

At this time, the $SF_6$ gas acts onto the face of the O ring groove 22c of the spacer 22, and the flange 21a of the first cylindrical vessel 21, the flange 23a of the second cylindrical vessel 23, and the spacer 23 are elastically deformed.

The strain amplifier 102 and the measurement recording unit 103 are actuated at the time of gas sealing into the first and the second cylindrical vessels 21 and 23, and the pressure value in the first and the second cylindrical vessels 21 and 23 and the output values of the strain sensors 1 and 2 at the time of the gas sealing are recorded in the measurement recording unit 103.

Figure 6:
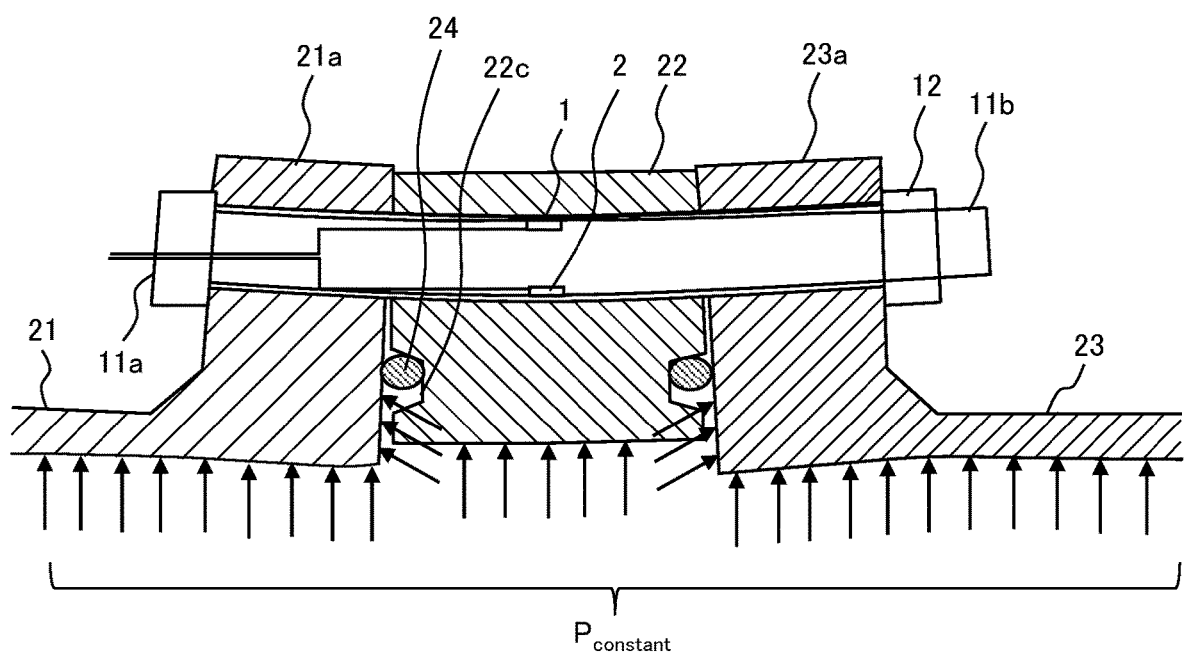
FIG. 6 is a diagram illustrating the coupling portion of the two cylindrical vessels according to the first embodiment of the gas pressure monitoring device of the gas insulated switchgear of the present invention and a state after the insulating gas at a defined pressure is sealed into the two cylindrical vessels.

As illustrated in FIG. 6 illustrating the coupling portion of the flange 21a of the first cylindrical vessel 21 and the flange 23a of the second cylindrical vessel 23 when the $SF_6$ gas or the like is sealed to the defined pressure $P_{constant}$ into the first and the second cylindrical vessels 21 and 23, with the flange 21a of the first cylindrical vessel 21 and the flange 23a of the second cylindrical vessel 23 being deformed to be bent by the gas pressure, the bolt with head 11b is also deformed to be bent.

Figure 7:
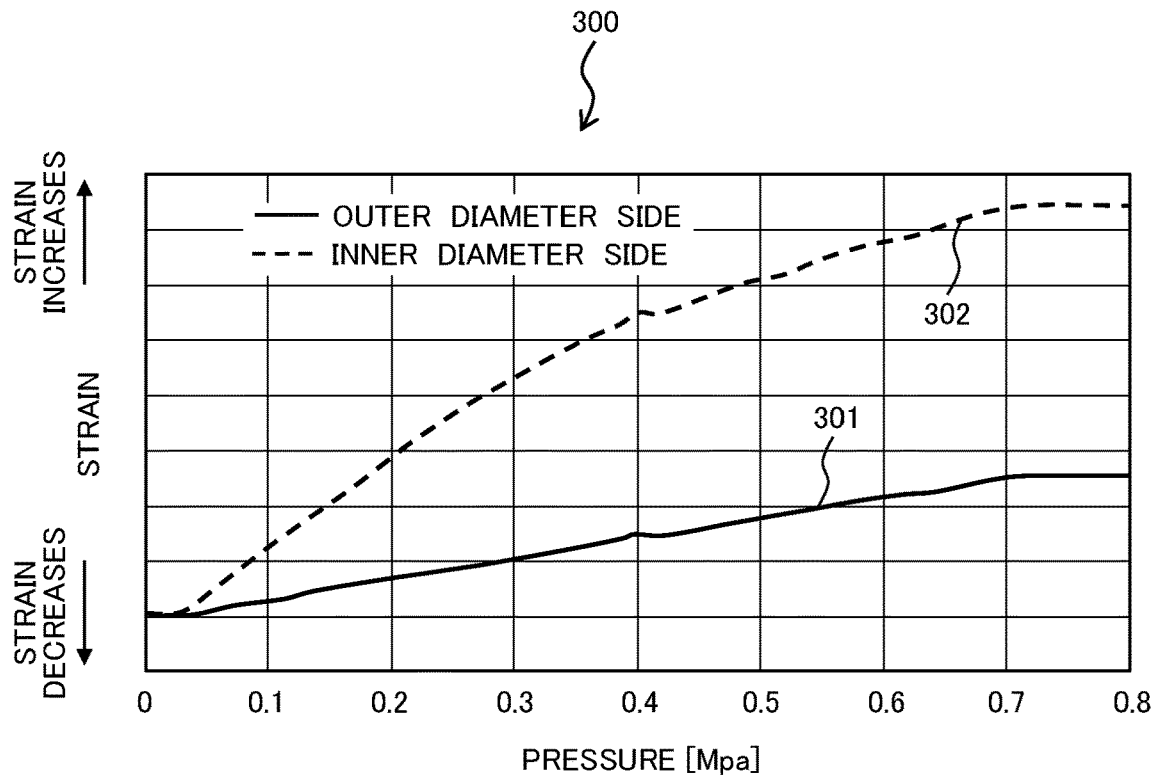
FIG. 7 is a diagram illustrating an example of the relationship between the reading value of a pressure gauge and the output values of strain sensors recorded when the insulating gas is sealed into the two cylindrical vessels according to the first embodiment of the gas pressure 5 monitoring device of the gas insulated switchgear of the present invention.

FIG. 7 illustrates a graph 300 that is an example of the relationship between the reading value of the pressure at the time of the $SF_6$ gas sealing of the pressure gauge 104, an output value 301 of the strain sensor 1, and an output value 302 of the strain sensor 2 when the $SF_6$ gas is sealed into the first and the second cylindrical vessels 21 and 23.

In FIG. 7, the output value 301 of the strain sensor 1 indicates the measurement value of the strain sensor 1 toward the outer diameter side of the first and the second cylindrical vessels 21 and 23, and the output value 302 of the strain sensor 2 indicates the measurement value of the strain sensor 2 toward the inner diameter side of the first and the second cylindrical vessels 21 and 23.

The vertical axis of the graph 300 of FIG. 7 indicates the output voltage of the strain sensors 1, 2. Before the $SF_6$ gas is sealed, the zero point of the strain is taken by the strain amplifier 102. With the increase in the gas pressure, the output value 302 of the strain sensor 2 toward the inner diameter side is larger than the output value 301 of the strain sensor 1 toward the outer diameter side. Accordingly, the evaluation unit 106 calculates the stress acting on the bolt with head 11b from the output values 301 and 302 of the two strain sensors 1 and 2 by the equation (1).

$$\sigma_T = E \times \frac{1}{2} \times (\varepsilon_{301} + \varepsilon_{302}) \qquad (1)$$

Here, $\sigma_T$ is the tension component of the stress acting on the bolt with head 11b, E is the longitudinal elastic modulus of the material of the bolt with head 11b, and $\varepsilon_{301}$, $\varepsilon_{302}$ are the strain values of the strain sensors 1 and 2. The relationship between the stress acting on the bolt with head 11b calculated by the equation (1) and the pressure value in the first and the second cylindrical vessels 21 and 23 is illustrated in a graph 303 of FIG. 8.

[Step 3 (S3)]

When the gas sealing of the $SF_6$ gas or the like is completed with respect to the first and the second cylindrical vessels 21 and 23, the gas pressure is monitored in the following steps.

[Step 4 (S4)]

Figure 8:
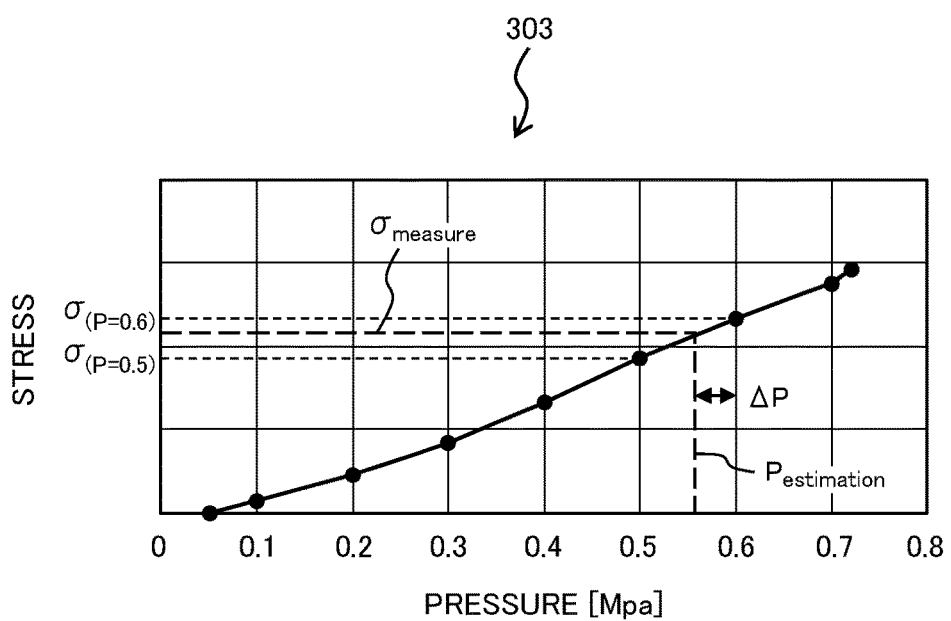
FIG. 8 is a diagram illustrating an example of the relationship between the gas pressure in the cylindrical vessels and the bolt stress according to the first embodiment of the gas pressure monitoring device of the gas insulated switchgear of the present invention.

That is, in the operation state of the gas insulated switchgear 100, the output values 301 and 302 of the strain sensors 1 and 2 and the surface temperature 105 of the first and the second cylindrical vessels 21 and 23 are obtained at predetermined time intervals, and are recorded by the measurement recording unit 103, and the bolt stress value is calculated by the evaluation unit 106 on the basis of the equation (1) described above. Then, the relationship between the stress acting on the bolt with head 11b and the pressure value in the first and the second cylindrical vessels 21 and 23 illustrated in FIG. 8 is calculated from the graph 303 of FIG. 8, and the relationship between the bolt stress value $\sigma_{measure}$ and the pressure value $P_{estimation}$ is calculated from the curve of FIG. 8.

It should be noted that the pressure value is converted to the 20° C. conversion pressure by using the state equation of a real gas. As the change in the pressure value, as illustrated in the graph 303 of FIG. 8 of the relationship between the stress acting on the bolt with head 11b and the pressure value in the first and the second cylindrical vessels 21 and 23, the decrease amount ΔP from the defined gas pressure is calculated.

[Step 5 (S5)]

When the gas pressure in the gas insulated switchgear 100 is lowered, the electric current shut-off performance of the gas circuit breaker is lowered, and consequently, there is a possibility that the electric current cannot be shut off. Accordingly, in step 5 (S5), whether or not the ΔP of the 20° C. conversion pressure has reached the predetermined threshold value is evaluated by the evaluation unit 106 described above, and when the ΔP of the 20° C. conversion pressure has reached the predetermined threshold value, as in step 6 (S6), a pressure lowering warning is displayed on the monitoring monitor 107 or the like. When the evaluation unit 106 evaluates that the ΔP of the 20° C. conversion pressure has not reached the predetermined threshold value, it returns to step 4 (S4) to perform the evaluation again.

According to the gas pressure monitoring method according to such the present embodiment, at least one bolt (the bolt with head 11b) of the plurality of bolts fastening the flanges 21a and 23a of the first and the second cylindrical vessels 21 and 23 configuring the gas insulated switchgear 100 for the $SF_6$ gas or the like is targeted, the change in the pressure in the first and the second cylindrical vessels 21 and 23 in a state where the gas insulated switchgear 100 is operated can be estimated according to the change in the stress acting on the bolt with head 11b, so that the gas pressure monitoring device having less gas leak risk can be obtained from the configuration leading the gas pressure from the conventional cylindrical vessel through the piping to the pressure sensor.

In addition, since the strain sensors 1 and 2 are provided on the bolt with head 11b in which deformation is more likely to be caused as compared with the outer face of the conventional cylindrical vessel, the gas pressure monitoring device can be provided as a device that is applicable to both of the change in the gas pressure during the operation of the gas insulated switchgear 100 and the evaluation of an accident point when an accident occurs in the gas insulated switchgear 100.

Further, the gas pressure monitoring device at low cost can be provided without performing any additional work for sensor installation with respect to the existing gas circuit breaker in which aging deterioration has progressed.

Therefore, according to the present embodiment, the strain sensors 1 and 2 replace the flange fastening bolt with the bolt with head 11b without changing the existing device configuration with respect to the gas insulated switchgear 100 having the $SF_6$ gas leak risk due to aging, so that the gas pressure can be monitored, and the gas pressure monitoring device that is simple and at low cost can thus be obtained.

Second Embodiment

A second embodiment of the gas pressure monitoring device of the gas insulated switchgear of the present invention will be described below.

Although not particularly described by illustration, in the second embodiment, the stress acting on the flange fastening bolt is calculated by being classified into the tension component and a bending component, and the change in the pressure in the first and the second cylindrical vessels 21 and 23 is estimated according to the change in these two stress components.

That is, the classification of the stress acting on the bolt with head 11b is calculated by the equation (1) described above and the following equation (2) by the evaluation unit 106 from the output values 301 and 302 of the two strain sensors 1 and 2.

$$\sigma_B = E \times \frac{1}{2} \times (\varepsilon_{301} - \varepsilon_{302}) \quad (2)$$

Here, $\sigma_B$ is the bending component of the stress acting on the bolt with head 11b.

In FIG. 8, although not illustrated, like the tension component $\sigma_T$ of the stress acting on the bolt with head 11b, the relationship in which with the increase in the pressure of the sealed gas, the bending component $\sigma_B$ of the stress of the bolt with head 11b is also increased is obtained.

Figure 9:
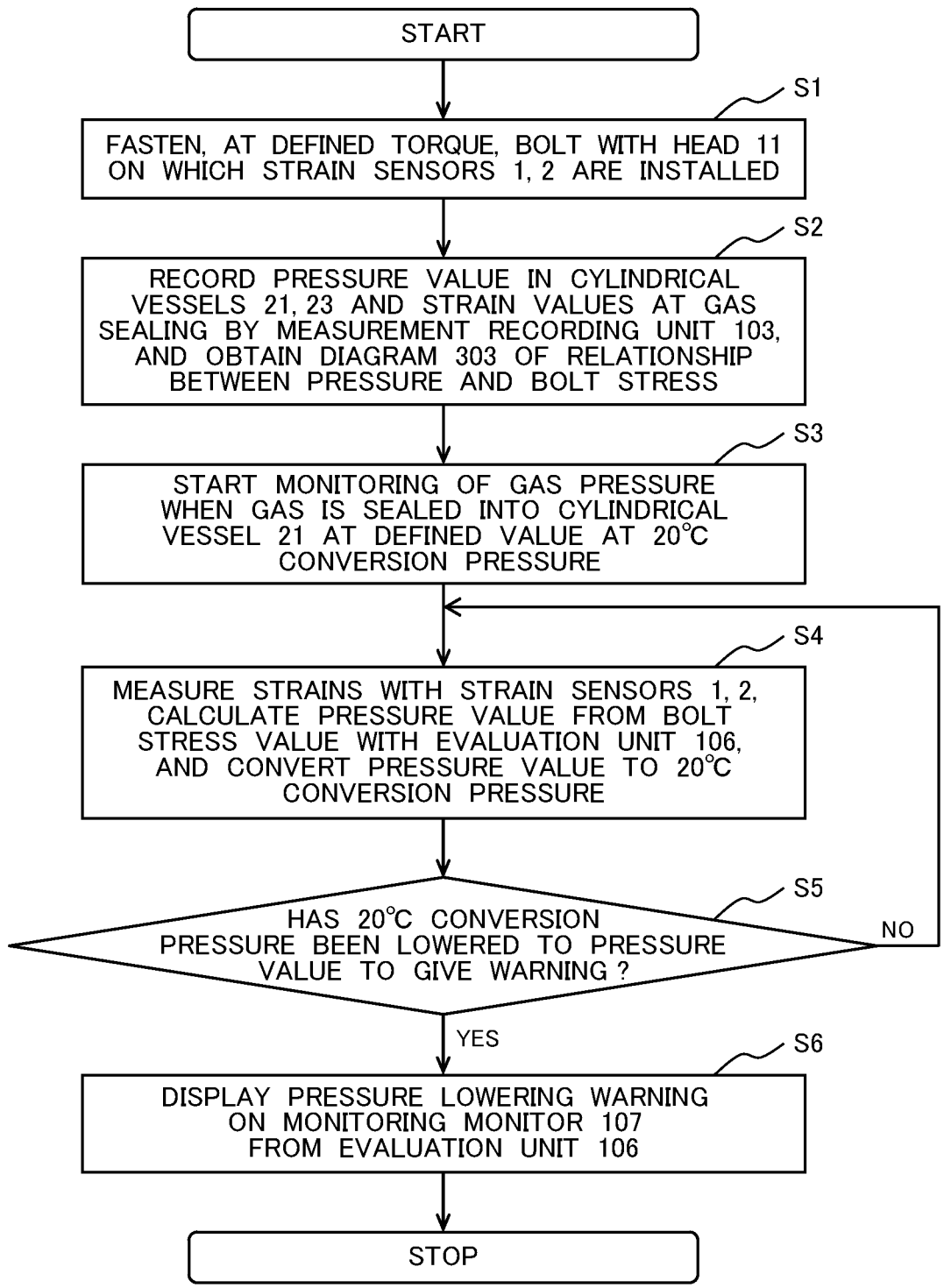
FIG. 9 is a diagram illustrating the flow of a gas pressure monitoring method of the gas insulated switchgear of the present invention.

Therefore, in step 2 (S2) of the flow of the gas pressure monitoring method of FIG. 9, when the increase in the stress with the increase in the gas pressure is $\sigma_T < \sigma_B$ and $\sigma_T$ is small, the gas pressure monitoring in step 3 (S3) is performed according to $\sigma_B$.

In such the present embodiment, the two strain sensors 1 and 2 are attached to the flange fastening bolt, so that the change in the gas pressure in the first and the second cylindrical vessels 21 and 23 can be precisely grasped even when the large/small relationship between the tension component and the bending component of the stress acting on the bolt with head 11b is changed.

It should be noted that as an example of the case where the stress acting on the bolt with head 11b is decreased, an event in which for example, the strain sensors 1 and 2 themselves are damaged or the wiring is disconnected is considered, but even in such a case, the two strain sensors 1 and 2 are used, and thereby, when the output of one of the strain sensors is significantly changed, the abnormality of the sensor itself can be diagnosed.

Third Embodiment

As a third embodiment of the present invention, a gas leak position identification method of the gas insulated switchgear will be described below.

In the present embodiment, the bolt with head 11b on which the strain sensors 1 and 2 are installed is incorporated into the flanges 21a and 23a of the first and the second cylindrical vessels 21 and 23 configuring the gas insulated switchgear 100 that has been aging deteriorated, and the position of a minute gas leak from the flanges 21a and 23a of the first and the second cylindrical vessels 21 and 23 is identified.

That is, since it can be considered that the symptom in which the bolt stress is lowered appears more quickly in the flange in which the gas leak is caused, the values of the stresses acting on the flanges 21a and 23a of the first and the second cylindrical vessels 21 and 23 detected by the strain sensors 1 and 2 are compared to enable the identification of the position of the minute gas leak in the flanges 21a and 23a to be performed during the operation of the gas insulated switchgear 100.

It should be noted that the present invention is not limited to the embodiments described above, and includes various modification embodiments. For example, the embodiments described above have been described in detail to simply describe the present invention, and are not necessarily required to include all the described configurations. In addition, part of the configuration of one embodiment can be replaced with the configurations of other embodiments, and in addition, the configuration of the one embodiment can also be added with the configurations of other embodiments. In addition, part of the configuration of each of the embodiments can be subjected to addition, deletion, and replacement with respect to other configurations.

REFERENCE SIGNS LIST 1, 2: strain sensor
11, 11b: bolt with head
11a: bolt head
12: nut
21: first cylindrical vessel
21a, 21b, 21c: flange of first cylindrical vessel
22: spacer
22c: O ring groove
23: second cylindrical vessel
23a: flange of second cylindrical vessel
24: O ring
100: gas insulated switchgear
101: signal line from strain sensor 102: strain amplifier
103: measurement recording unit
104: pressure gauge
105: surface temperature of cylindrical vessel
106: evaluation unit
107: monitoring monitor
301, 302: output value of strain sensor
g21, g23: gap

What is claimed is:

1. A gas pressure monitoring method of a gas insulated switchgear,
   wherein at least one bolt of a plurality of bolts fastening flanges of at least two cylindrical vessels is targeted, the vessels configuring the gas insulated switchgear and receiving an internal pressure,
   wherein pressure of an insulating gas in a cylindrical vessel is detected by a sensor mounted on the one bolt, the cylindrical vessel being in a state where the gas insulated switchgear is operated, and
   wherein change in a stress acting on the one bolt is estimated based on detection values of the sensor to monitor the pressure of the insulating gas.

2. A gas pressure monitoring method of a gas insulated switchgear,
   wherein at least one bolt of a plurality of bolts fastening flanges of at least two cylindrical vessels is a bolt with sensor installed on the cylindrical vessels, the vessels configure the gas insulated switchgear and receive an internal pressure, and the bolt with sensor has at least one sensor mounted toward each of an inner diameter side and an outer diameter side of a cylindrical vessel to measure stress acting on the bolt with sensor in the axial direction thereof,
   wherein reading values of a pressure gauge and output values of the at least one sensor when an insulating gas is sealed into the cylindrical vessel are recorded by a measurement recording unit,
   wherein a relationship between pressure of the insulating gas and stress acting on the bolt with sensor when the insulating gas is sealed into the cylindrical vessel is calculated by an evaluation unit, and
   wherein, after an operation of the gas insulated switchgear is started, change in the pressure in the cylindrical vessel is estimated from change in the stress acting on the bolt with sensor, so as to enhance monitoring the pressure of the insulating gas.

3. The gas pressure monitoring method of the gas insulated switchgear, according to claim 2,
   wherein surface temperature of the cylindrical vessel detected by a temperature sensor is recorded in the measurement recording unit.

4. The gas pressure monitoring method of the gas insulated switchgear, according to claim 2,
   wherein the stress acting on the bolt with sensor is calculated with divided into a tension component and a bending component, and
   wherein the change in the pressure in the cylindrical vessel is estimated based on change in the two calculated components of the stress, so as to enhance monitoring the pressure of the insulating gas.

5. A gas pressure monitoring device of a gas insulated switchgear, the gas pressure monitoring device comprising:
   at least two cylindrical vessels that configures the gas insulated switchgear, receives an internal pressure, and have flanges;
   a plurality of bolts that fasten the flanges of the two cylindrical vessels;
   a bolt with sensor, the bolt with sensor being at least one bolt of the plurality of bolts and including at least one sensor on mounted toward each of an inner diameter side and an outer diameter side of a cylindrical vessel to measure stress acting on the bolt with sensor in the axial direction thereof;
   a pressure gauge that is installed on the cylindrical vessel and reads pressure of an insulating gas when the insulating gas is sealed into the cylindrical vessel;
   a measurement recording unit that records reading values of the pressure gauge and output values of the sensor; and
   an evaluation unit that calculates relationship between the pressure of the insulating gas and stress acting on the bolt with sensor when the insulating gas is sealed into the cylindrical vessel,
   wherein, after an operation of the gas insulated switchgear is started, change in the pressure in the cylindrical vessel is estimated from change in the stress acting on the bolt with sensor, so as to enhance monitoring the pressure of the insulating gas.

6. The gas pressure monitoring device of the gas insulated switchgear, according to claim 5,
   wherein the sensor is provided on an inner peripheral face of the bolt with sensor at a position substantially midway between end faces of the flanges of the respective two cylindrical vessels in an axial direction of the bolt with sensor.

7. The gas pressure monitoring device of the gas insulated switchgear, according to claim 6,
   wherein surface temperature of the cylindrical vessel detected by a temperature sensor is recorded in the measurement recording unit.

8. A gas leak position identification method of a gas insulated switchgear,
   wherein a sensor is installed on at least one bolt of a plurality of bolts, the bolts fastening flanges of at least two cylindrical vessels that configures the gas insulated switchgear and receives an internal pressure, and the sensor detecting stresses acting on the at least one bolt of the respective two cylindrical vessels, and
   wherein values of the stresses acting on the at least one bolt of the respective two cylindrical vessels detected by the sensor are compared with one another to identify a position of a gas leak from the flanges.

* * * * *